United States Patent
Chery

[15] 3,670,595
[45] June 20, 1972

[54] VARIABLE SPEED AUTOMATIC TRANSMISSION

[72] Inventor: Walter Valdemar Chery, 744 Alden Street, Meadville, Pa. 16335

[22] Filed: Dec. 17, 1969

[21] Appl. No.: 885,912

[52] U.S. Cl. .................................................. 74/688, 74/796
[51] Int. Cl. ................................... F16h 47/08, F16h 13/08
[58] Field of Search ................... 74/688, 796, 798, 690, 691

[56] References Cited

UNITED STATES PATENTS

| | | | |
|---|---|---|---|
| 2,224,884 | 12/1940 | Schneider et al. | 74/688 |
| 2,572,310 | 10/1951 | Brown | 74/688 X |
| 3,203,278 | 8/1965 | General | 74/796 X |
| 3,224,298 | 12/1965 | Hill | 74/688 |
| 3,293,945 | 12/1966 | Stockton | 74/796 X |
| 3,299,743 | 1/1967 | Stockton | 74/796 X |
| 3,394,617 | 7/1968 | Dickenbrock | 74/730 |

FOREIGN PATENTS OR APPLICATIONS

| | | | |
|---|---|---|---|
| 450,246 | 7/1936 | Great Britain | 74/688 |

Primary Examiner—C. J. Husar
Assistant Examiner—Thomas C. Perry
Attorney—Charles L. Lovercheck

[57] ABSTRACT

This specification discloses an infinitely variable speed transmission. The transmission is made up of a friction planetary drive and a torque converter. The reactive member of the friction drive and the output of the torque converter are connected to the output of the transmission.

6 Claims, 6 Drawing Figures

PATENTED JUN 20 1972 3,670,595

Inventor
WALTER V CHERY

By
Charles L. Lovshuk
Attorney

VARIABLE SPEED AUTOMATIC TRANSMISSION

GENERAL DESCRIPTION

Applicant's patent application, Ser. No. 662,397, now abandoned, discloses an infinitely variable transmission wherein the speed may be infinitely changed from a low ratio to a 1:1 ratio. At the 1:1 ratio, the friction rollers, friction rings and sun wheels automatically rotate as a unit. To eliminate brinneling of the roller members on the rings and sun wheels which they engage, which is normally caused by vibration when the rolling elements are locked, a low speed relative motion between the rolling elements was introduced.

The above was accomplished by connecting a friction planetary drive to a set of planetary gears and to a hydraulic torque converter. The purpose of the present invention is to simplify the invention mentioned above and to reduce the cost of the unit by providing an arrangement which does not use planetary gears for changing speeds but uses frictional drive. This is accomplished by connecting a reactive member of a friction drive and the output of a hydraulic converter to a common point or the output of the transmission.

STATEMENT OF INVENTION

This invention relates to transmissions and, more particularly, to friction type automatic transmissions.

OBJECTS OF THE INVENTION

It is an object of the invention to provide an improved automatic transmission.

Another object is to provide an automatic transmission that is simple in construction, economical to manufacture and simple and efficient to use.

Another object of the invention is to provide an improved combination friction transmission, clutches and torque converter.

DETAILED DESCRIPTION OF THE DRAWINGS

Figure 1:
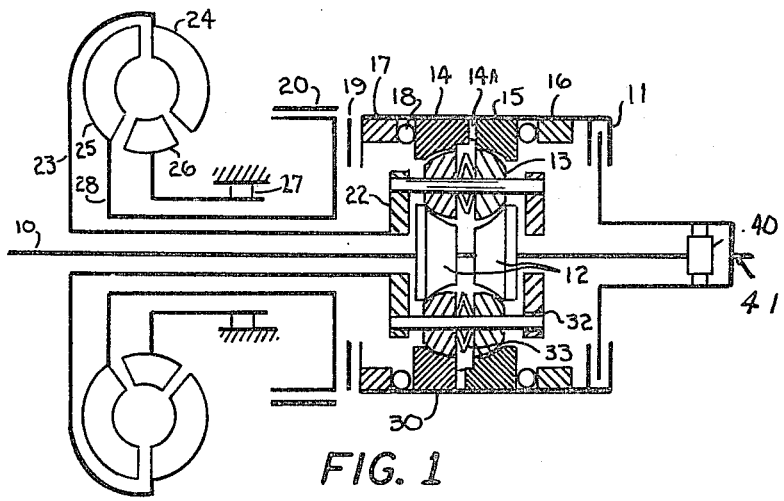
FIG. 1 is a diagrammatic view of one of the embodiments of the invention.

Referring now with more particular reference to the embodiment of the invention shown in FIGS. 1, 3, 4, 5 and 6, a transmission is shown made up of a torque converter, a friction transmission, and clutches 11 and 19, and overrunning clutch 40. The friction transmission is made up of sun rolls 12, which are the input of the transmission, and are connected to an engine or other prime mover through shaft 10. The sun rolls 12 are slidably splined to the input shaft 10 and secured against sliding apart by snap rings 39.

Belleville springs 34 are disposed at the ends of sun rolls 12 and are compressed to flat position to control the initial preload to simplify the assembly.

The Belleville springs 33 may be in the form of round disks having an opening in the center to receive the shafts 50 which support the rolls 13. The shaft 21 is supported in planetary cage 22 by bearings 32.

The sun rolls 12 have a concave outer periphery which has a radius of curvature slightly greater than that of the planetary rollers 13. The planetary rollers 13 each have an outside surface which is in the form of a hemisphere with the ends flattened off, as shown, and the radius of the hemisphere is slightly less than the radius of the curvature of the sun rolls 12. The planetary rollers are keyed to the planet shafts 50 and can slide on the keys 36 and are urged apart by the preload Belleville springs 33.

The planet rolls 13 in turn are in rolling contact with the outer rings 14 and 15. Outer rings 14 and 15 can rotate and slide axially in housing 30 in relation to each other and are interconnected (coupled) at point 14A. The radius of curvature of the curved surface of outer rings 14 and 15 which engages the planetary rolls 13 is slightly larger than that of the planet rolls 13. The outer rings 14 and 15 each have cam surfaces indicated as at 51 and 52 in FIG. 4 and the cam surfaces 52 on rings 15 and similar cam surfaces on ring 14 are in rolling contact with balls 18. Balls 18 in turn are in rolling contact with the cam portion of 51 of the reactive rings 16 and 17. The reactive rings 16 and 17 are splined or keyed at 35 in the housing 30. The housing 30 is connected through reverse clutch 19 to the output 25 of the torque converter. The hydraulic torque converter has an impeller 24, an output 25 and a stator 26. The output 25 is connected through second output means 28 to the clutch 19. The impeller 24 is connected through means 23 to the planetary cage 22. The stator 26 is connected by the overrunning brake 27 to the transmission housing 50. The overrunning clutch 40 connects sun rolls 12 and input 10 as shown to output of transmission 41.

Planetary pinion shafts 21 are received in suitable bearings 32 and the planet assembly slides axially in the planetary cage 22. The planetary cage 22 is connected by members 23 to the impeller 24 of the torque converter.

Operation

When the transmission has its shaft 10 connected to a prime mover or engine and its first output 40 connected to a load and it has shifted to the driving range, clutches 19 and 11 are applied and the brake band 20 is released. At idling, due to slippage of the torque converter, the planetary rolls 13 roll freely on the outer rings 14 and 15 which remain stationary. During acceleration, power flows from the clutch 11 through the sun rolls 12, planetary rolls 13, planetary cage 22, member 23, to the impeller 24 of the torque converter, while outer rings 14 and 15, rolling cams 16 and 17 and housing 30 are connected through clutch 11 to output of transmission 41 serves friction drive as reactive member.

The output 25 of the hydraulic torque converter is also connected through clutch 19 and housing 30 to the output 41 of the transmission. Therefore, at the beginning of acceleration, full torque multiplication is provided with the full torque required at input 24 for the torque converter.

Figure 4:
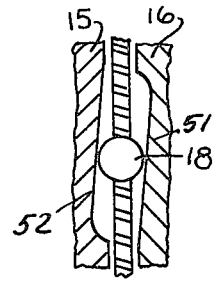
FIG. 4 is an enlarged cross-sectional partial view of the cam surface and cam balls.

To meet the above requirements, planetary rolls 13 will move outer rings 14 and 15 in relation to cam rings 16 and 17, FIG. 4, and inward overcoming the preload springs 33 thus resulting in moving the planetary rolls 13 inward and radially and changing the ratio of the friction transmission until the required torque multiplication occurs to carry the load.

At this instant, force is applied to the outer rings 14 and 15 by the planetary rolls 13 and will push the housing 30 in reverse while greater force multiplication in the hydraulic torque converter will push the housing 30 forward resulting in a forward speed.

From the point where acceleration starts, the ratio of the transmission will operate over an infinite range and, at the end of acceleration, when accelerator pedal is eased thereby reducing engine RPM, the hydraulic torque converter becomes locked, locking friction drive, also. The forces on the parts of the friction transmission are balanced, will automatically reach a 1:1 ratio and all the members will rotate as a single part. Due to slight slippage that normally occurs in a hydraulic torque converter at a 1:1 ratio, the housing 30 will rotate at a slightly lesser velocity than the sun wheels 12, which are connected directly to the prime mover and, therefore, a low relative velocity will be introduced between the planet rolls 13 and the sun rolls 12 and planet rolls 13 and outer rings 14 and 15. This relative velocity will prevent brinneling of the rolling elements which would occur if the rolling elements were locked and did not rotate relative to each other.

Reverse

When the reverse band 20 is applied, the output 25 of the torque converter will be locked and remain stationary while the reverse clutch 19 will be released. Thus the power will flow through the friction transmission to the hydraulic torque converter in the same manner as in driving range except the power will not be transmitted to the housing 30, through the hydraulic torque converter since the clutch 19 is released. Therefore, forces from the planetary rolls 13 push the housing 30 in reverse while the planetary cage 22 serves as a reactive member. The ratio of the friction drive will be changed infinitely in the same manner as is in the driving range. The only difference being that the output 41 will rotate in the reverse direction.

Coasting

During coasting in normal driving range, while the speed of the output member 41 exceeds the idling speed of the engine, the overrunning clutch 40 connects the output member 41 through the input shaft 10 directly to the engine to provide braking. When heavy braking during coasting is required, the coasting clutch 11 is released and brake 20 is applied. During heavy coasting the clutch 19 remains applied. In this case rings 14 and a turbine of the hydraulic torque converter are held stationary by brake 20 and planetary rolls 13 are forced to roll on outer rings 14, turning through planetary cage 22 the impeller 24 of hydraulic torque converter.

It should be understood that due to the preload in friction drive to overcome friction forces, approximately 10 percent of a nominal torque (engine drive) is required to turn the unit and this adds to braking by the engine.

Also, at the speed between 20–25 MPH with approximately reduction 1.5 in friction unit in high gear (referring to FIG. 1), the impeller 24 will rotate approximately at 600–700 RPM, while turbine 25 is locked by band 20 and remain stationary. The above conditions are similar to idling in present automatic transmission and will provide additional braking, while no over-heating occurs at that speed in hydraulic torque converter.

The above three factors — braking by engine, resistance in friction drive, and braking by hydraulic torque converter — will provide sufficient forces for braking at coasting. Thus the second output member 25 of the hydraulic turbine will be locked and remain stationary. In this case, power flows from the first output member 41 through the overrunning clutch 40 to the input shaft 10. It splits there and part of the power goes to the engine while the other part of the power goes to the sun rolls 12, planet rolls 13, planetary cage 22, to the hydraulic torque converter which provides additional mild braking. In neutral, the band 20, clutches 21 and 19 are released.

Figure 2:
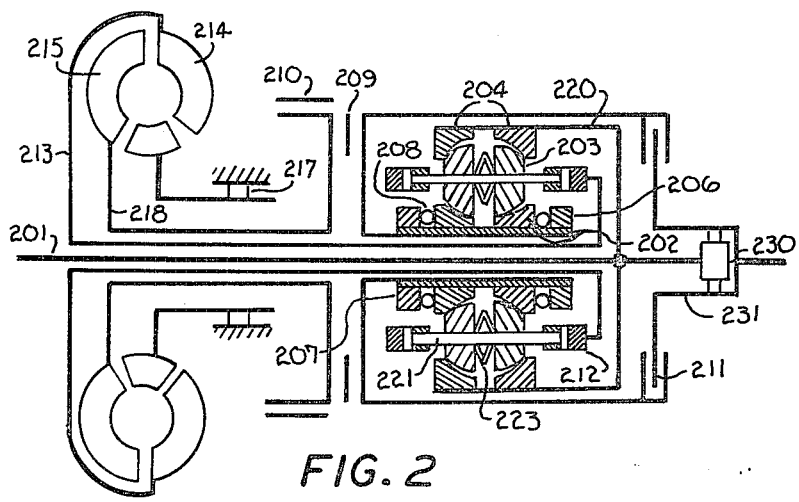
FIG. 2 is a diagrammatic view of another embodiment of the invention.
Figure 5:
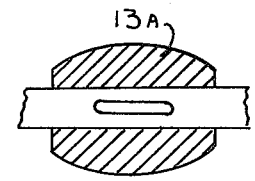
FIG. 5 is an enlarged cross-sectional view of one of the rollers.
Figure 3:
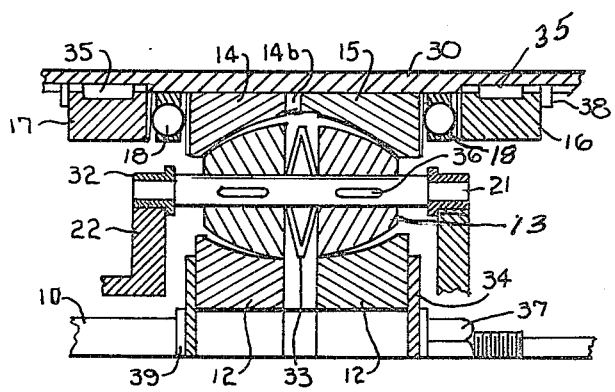
FIG. 3 is an enlarged view of the planetary roller, sun wheels and rings and cams of the invention.

In the embodiment of the invention shown in FIG. 2, the outer rings 204 serve as an input and the sun rolls 202 and the reactive cams 206 serve as output of the friction drive. In other respects, the unit of FIG. 2 functions identical to that shown in FIG. 1. For low horsepower units, the planetary rolls 13 of FIG. 1 can be replaced with a solid roll 13a as shown in the embodiment of FIG. 5 and the preload springs 33 of the embodiment of FIG. 1 can be omitted. In this case, the friction unit will be controlled by roller or ball cams 16 and 17 and Belleville springs 33 while the sun rolls 12 can slide inward and outward.

Figure 6:
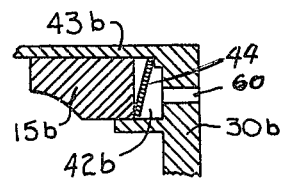
FIG. 6 is an enlarged cross-sectional view of the friction ring and Belleville spring arrangement according to the invention with hydraulic control to change the speed ratio.

FIG. 6 shows when hydraulic control is used to change ratios infinitely and where rolling cams are replaced by Belleville spring 44 and hydraulic chamber 42b. Normally in drive, Belleville springs 44 are flattened and provide basic preload. Hydraulic pressure is introduced in chamber 42b only to change ratios and, therefore, common low pressure up to 125 psi is enough to operate the unit (no high pressure) and design of parts is light.

Referring to FIG. 6, a hydraulic fluid can be admitted through opening 60 to chamber 42b to supplement the force of spring 44. Thus a weaker spring can be used.

The foregoing specification sets forth the invention in its preferred practical forms but the structure shown is capable of modification within a range of equivalents without departing from the invention which is to be understood is broadly novel as is commensurate with the appended claims.

In the embodiments of the invention in which an exclusive property or privilege is claimed are defined as follows:

1. In combination a hydraulic torque converter, and a friction planetary drive,
   said friction planetary drive having first element, second element and third element,
   said hydraulic torque converter having a first element, a second element and a third element,
   means connecting said first element and said second element of said hydraulic torque converter to said first element and said second element respectively of said friction planetary drive,
   an input means connected to said third element of said friction planetary drive,
   and said means for connecting including means for selectively locking said second element of said hydraulic torque converter to said second element of said friction planetary drive and further to a member fixed relative to the support means for said friction planetary drive and said hydraulic torque converter,
   an output and means selectively connecting said output to said input and to said second element of said friction planetary drive,
   and means to selectively connect said third element of said hydraulic torque converter to said member fixed relative to said friction planetary drive.

2. The combination recited in claim 1 wherein said friction planetary drive third element comprises a sun roll connected to said input, and said friction planetary drive second element comprises outer rings,
   said friction planetary drive first element comprises a planetary cage.

3. The combination recited in claim 1 wherein said friction planetary drive has outer rings and a planetary cage supporting rolling elements,
   and cam means on said outer rings, said cam means being adapted to move said outer rings toward and away from said planetary rolls in proportion to torque exerted between said input and said output whereby a variable speed ratio is provided between said input and said output.

4. The combination recited in claim 1 wherein said first element of said friction planetary drive is a planetary cage, said second element of said friction planetary drive is a sun element, and said third element of said friction planetary drive is a ring element.

5. The combination recited in claim 4 wherein means is provided to control the ratio of said planet members and said ring members.

6. The combination recited in claim 4 wherein preload force is provided between said ring members and said planet members and means to supplement said preload force.

* * * * *